United States Patent Office 3,793,280
Patented Feb. 19, 1974

3,793,280
STABLE SOLUTIONS OF MELAMINE-UREA-FORMALDEHYDE CONDENSATES CONTAINING A STABILIZING ALDEHYDE AND PROCESSES FOR THEIR PREPARATION
Stanley Robert Sandler, 221 Hemlock Lane, Springfield, Pa. 19064
No Drawing. Filed June 25, 1970, Ser. No. 49,962
Int. Cl. C08g 51/58, 9/30
U.S. Cl. 260—29.4 R       12 Claims

ABSTRACT OF THE DISCLOSURE

Stable aqueous alkaline solutions of curable melamine-urea-formaldehyde condensates suitable for adhesives and for treatment of paper and textiles are prepared by incorporating 0.1 to 5 moles, per mole of melamine, of a stabilizing aldehyde selected from the group of acetaldehyde, glyoxal, propionaldehyde and glutaraldehyde.

BACKGROUND OF THE INVENTION

Intermediate, curable condensates of melamine with urea and formaldehyde have well-established uses in wood glues and other adhesives as well as in the treatment of substrates such as paper and textiles to impart decorative properties, stiffness, or resistance to creasing and wrinkling. In most of these applications, it is desirable to work with aqueous solutions of the condensate and in particular, with concentrated solutions yielding between 40% and about 60% solids on evaporation to dryness. Melamine, urea and formaldehyde condense conveniently in aqueous solution at the desired concentration but the commercial exploitation of such solution suffers a serious drawback in the fact that the physical stability of the solutions in quite poor. For example, the addition of 3.2 moles of formaldehyde to 0.4 mole of melamine and 1.0 mole of urea at the aforementioned solids level yields a solution so unstable that precipitation occurs in less than one day.

Since it is usually inconvenient to carry out the condensation reaction at the point of application, attempts have been made to overcome the problem of instability, but no satisfactory solution has been reached. One approach involves drying the condensate, as by spray drying, then grinding the dried material to shippable powdered form, and redissolving at the point of application. However, this entails additional time and expense at both manufacturing and application stages and is still encumbered by instability of the reconstituted solution so that relatively small batches of solution must be repeatedly prepared. Another approach has been directed to altering the condensate by incorporation of non-aqueous materials, such as alcohols, to give greater resistance to hydrolysis and polymerization. Such products have not proved sufficiently equivalent in performance to the simple melamine-urea-formaldehyde condensates since they undergo undesirable changes in properties and decompose back to volatile alcohols or subsequent curing. Of similar nature is German Pat. No. 1,266,965 which describes stabilization of melamine-formaldehyde condensates by addition to the condensates from 0.1 to 5% of an aldehyde such as acetaldehyde, propionaldehyde, and isobutyraldehyde.

DESCRIPTION OF THE INVENTION

I have now prepared alkaline aqueous solutions of curable melamine-urea-aldehyde condensates which surprisingly remain physically stable even at concentrations as high as 80% solids for periods up to several months without substantially impairing their performance properties in adhesives and other applications. These properties being substantially the same as those of the simple melamine-urea-formaldehyde condensates of the prior art.

The novel aqueous compositions or condensates are prepared by reacting one mole of melamine with 3–10 moles of formaldehyde, 0.5–5 moles urea and 0.1–5 moles of the stabilizing aldehyde selected from acetaldehyde, glyoxal, glutaraldehyde and propionaldehyde. The stabilizing aldehyde can be added in undiluted or aqueous solution form. The aqueous composition must be alkaline, the preferred pH range being 8.0–11.5. In the preferred embodiment, 3–8 moles of formaldehyde, 1–4 moles of urea and 0.5–3 moles of the stabilizing aldehyde are reacted with one mole of melamine. Less than about 0.1 mole of the stabilizing aldehyde per mole of melamine will not impart the desired stability to the product, while amounts in excess of about 5 moles of the stablizing aldehyde per mole of melamine will substantially impair the product when used in the conventional applications. Use of greater amounts of the stabilizing aldehyde will also reflect unfavorably on the cost of the product. Since urea is cheaper than melamine, a maximum amount of urea can be used for preparing the condensate that will not adversely affect the character of the condensate for intended applications.

The condensate can be prepared by adding melamine and urea to an aqueous solution of formaldehyde and the stabilizing aldehyde. Alkalinity of the aqueous aldehyde mixture is adjusted to the desired value prior to addition of melamine and urea. An exotherm develops raising the temperature of the reaction mixture to between 40° C. and 50° C. The temperature is maintained at about 50° C. for 1–2 hours after melamine and urea are dissolved. When the reaction is complete, pH of the resulting condensate is adjusted to the desired level with aqueous sodium hydroxide.

The melamine-urea-formaldehyde-stabilizing aldehyde condensate can also be prepared by merely mixing melamine-formaldehyde-stabilizing aldehyde condensate with urea-formaldehyde condenstate. The urea-formaldehyde condensate is prepared in a conventional manner; the melamine-formaldehyde-stabilizing aldehyde condensate can be prepared in accordance with the procedures described in a co-pending application entitled "Stable Aqueous Melamine Condensates," which is incorporated herein by reference for the purposes of rendering this disclosure complete. The resulting condensate is clear and stable and exhibits good adhesive properties.

It is of critical importance that the resulting aqueous composition be alkaline and preferable, in the pH range of 8.0–11.5. It has been found that when the pH of the condensate is at least moderately alkaline, the stability of the condensate is enhanced and its viscosity can be maintained in a range suitable for conventional applications. The suitable viscosity range is up to about 3000 cps., and preferably, in the range of 200 to 2500 cps., measured at 25° C. This can be accomplished by either carrying out the reaction at an alkaline pH which would result in a product having the desired alkalinity, or by reacting the melamine and urea with the aldehydes in a conventional manner and subsequently adjusting the pH of the product with aqueous sodium hydroxide. In another variation of the process, the reaction is carried out in an alkaline medium and the product is subsequently adjusted to the desired pH.

As is known in the prior art, formaldehyde is stabilized by addition of an inhibiting agent, such as methyl or ethyl alcohol, in order to prevent paraformaldehyde formation and consequent precipitation from solution. Amount of the inhibiting agent that is generally added to formaldehyde is in the range of 12% to 15% by weight of the formaldehyde.

The following examples are presented for the purpose of illustrating the invention.

Example 1

An aqueous mixture of 259.2 g. (3.2 moles) of 37% formaldehyde, inhibited with 13.2% methanol, and 4.4 g. (0.1 mole) of acetaldehyde was added to a reaction vessel and the pH thereof was adjusted with aqueous solution of sodium hydroxide to about 8.5. After rapidly adding to the reaction vessel 50.4 g. (0.4 mole) of melamine and 60 g. (1.0 mole) of urea, the reaction mixture reacted exothermally to raise the temperature of the mixture to between 40° C. and 50° C. The temperature of the reaction mixture was maintained at about 50° C. by means of a water bath for about 1½ hours after melamine and urea went into solution. The pH of the resulting condensate was adjusted to about 10.5. After standing at room temperature for 32 days, viscosity of the condensate, measured at 25° C. was 250 cps.

Example 2

In this example, a number of condensates were prepared, in varying mole ratios, and then tested for stability at the indicated periods of time. The condensates were prepared in accordance with the procedure of Example 1.

TABLE I

| Sample | Moles | | | | Stability in days | Viscosity, ª25° C., cps. |
|---|---|---|---|---|---|---|
| | Melamine | Urea | Formaldehyde | Acetaldehyde | | |
| 1 | 0.4 | 1.0 | 3.2 | 0 | <1 | ¹ Ppt. |
| 2 | 0.4 | 1.0 | 3.2 | 0.1 | 32 | 250 |
| 3 | 0.5 | 1.0 | 3.5 | 1.0 | 29 | 300 |
| 4 | 0.2 | 1.0 | 2.6 | 0.02 | 2 | ¹ Ppt. |
| 5 | 0.4 | 1.0 | 3.2 | 0.1 | 22 | 22,250 |
| 6 | 0.4 | 1.0 | 3.2 | 0.4 | 22 | 260 |
| 7 | 0.4 | 1.0 | 3.2 | 0.8 | 19 | 1,600 |

¹ Precipitate formed.

Samples 5, 6 and 7 were heated for 3–4 hours at 50–85° C. The formaldehyde used was a 37% aqueous solution inhibited with 13.2% methanol.

Example 3

Procedure of Example 1 was followed in this example with the exception that acetaldehyde was replaced by glyoxal.

TABLE II

| Sample number | Moles | | | | Stability, days | ª25° C. and pH of 7.0; viscosity, cps. |
|---|---|---|---|---|---|---|
| | Melamine | Urea | Glyoxal | Formaldehyde | | |
| 1 | 0.5 | 0.5 | 2.0 | 3.0 | 50 | 80 |
| 2 | 0.5 | 0.5 | 1.0 | 3.0 | 48 | 240 |
| 3 | 0.8 | 0.2 | 2.0 | 3.0 | 43 | 160 |

Formaldehyde was in the form of a 37% aqueous solution inhibited with 13.2% methanol.

I claim:

1. A process for preparing a stable alkaline aqueous solution of a curable melamine-urea-formaldehyde condensate comprising reacting at a pH of 8.0 to 11.5 formaldehyde and a stabilizing aldehyde with melamine and urea in the respective mole ratio of 3–10/0.1–5/1/0.5–5, the stabilizing aldehyde being selected from acetaldehyde, glyoxal, propionaldehyde, glutaraldehyde and mixtures thereof.

2. Process of claim 1 wherein the mole ratio of formaldehyde/acetaldehyde/melamine/urea is 3–8/0.5–3/1/1–4.

3. Process of claim 1 including the step of maintaining the temperature of the reaction mixture between 40° C. and 50° C. for 1 to 2 hours after melamine and urea have dissolved in the reaction mixture.

4. Process of claim 1 including an effective amount of formaldehyde inhibitor for preventing paraformaldehyde formation.

5. Process of claim 1 wherein the formaldehyde is in the form of an aqueous solution inhibited with an effective amount of methanol for preventing paraformaldehyde formation.

6. Process of claim 5 wherein the effective amount of methanol is in the range of 12% to 15%.

7. Process of preparing a stable aqueous alkaline solution of a curable melamine-urea-aldehyde condensate comprising mixing melamine/formaldehyde/stabilizing aldehyde condensate with a urea/formaldehyde condensate, the melamine/urea/formaldehyde/stabilizing aldehyde ratio of the resulting condensate being in the range of 1/0.5–5/3–10/0.1–5.

8. A stable alkaline condensate prepared by the process of claim 1.

9. A stable alkaline condensate prepared by the process of claim 7.

10. Process of claim 1 wherein the solution of the condensate has a solids concentration of up to 80% and wherein the reaction is carried out by mixing an aqueous solution of formaldehyde and the stabilizing aldehyde, adjusting the pH of the mixture to from 8.0 to 11.5, adding melamine and urea to the mixture and allowing the reaction to proceed until all of the melamine and urea go into solution.

11. Process of claim 4 wherein the solution of the condensate has a solids concentration of up to 80% and wherein the reaction is carried out by mixing an aqueous solution of formaldehyde with the stabilizing aldehyde, adding melamine and urea, allowing the reaction to proceed until at least all of the melamine and urea go into solution and adjusting pH of the resulting solution of the condensate to form 8.0 to 11.5.

12. Process of claim 4 wherein the solution of the condensate has a solids concentration of up to 80% and wherein the step of reacting at a pH of 8.0 to 11.5 is accomplished by adding an aqueous solution of sodium hydroxide.

References Cited

UNITED STATES PATENTS

| | | | |
|---|---|---|---|
| 3,428,607 | 2/1969 | Renner | 260—67.6 R |
| 3,394,093 | 7/1968 | Salem | 260—29.4 R X |
| 3,261,795 | 7/1966 | Goullon et al. | 260—29.4 R |
| 2,978,359 | 4/1961 | Wedell | 260—29.4 R X |
| 3,049,446 | 8/1962 | Goldstein et al. | 260—70 R UX |
| 2,876,062 | 3/1959 | Tarke et al. | 260—70 R X |
| 3,458,464 | 7/1969 | Shriver et al. | 260—67.6 R X |
| 3,129,226 | 4/1964 | Cleek et al. | 260—67.6 R X |
| 2,898,324 | 8/1959 | Mackay | 260—70 R X |

JEFFERY R. THURLOW, Primary Examiner

J. B. LOWE, Assistant Examiner

U.S. Cl. X.R.

260—67.6 R, 700 R

UNITED STATES PATENT OFFICE
CERTIFICATE OF CORRECTION

Patent No. 3,793,280          Dated February 19, 1974

Inventor(s) Stanley Robert Sandler

It is certified that error appears in the above-identified patent and that said Letters Patent are hereby corrected as shown below:

Assignee: Borden, Inc.

Signed and sealed this 2nd day of July 1974.

(SEAL)
Attest:

EDWARD M. FLETCHER, JR.　　　　　　　　　C. MARSHALL DANN
Attesting Officer　　　　　　　　　　　　Commissioner of Patents